Oct. 29, 1963    C. VORPAHL    3,108,382
TORSION BAR GAUGE
Filed May 1, 1961
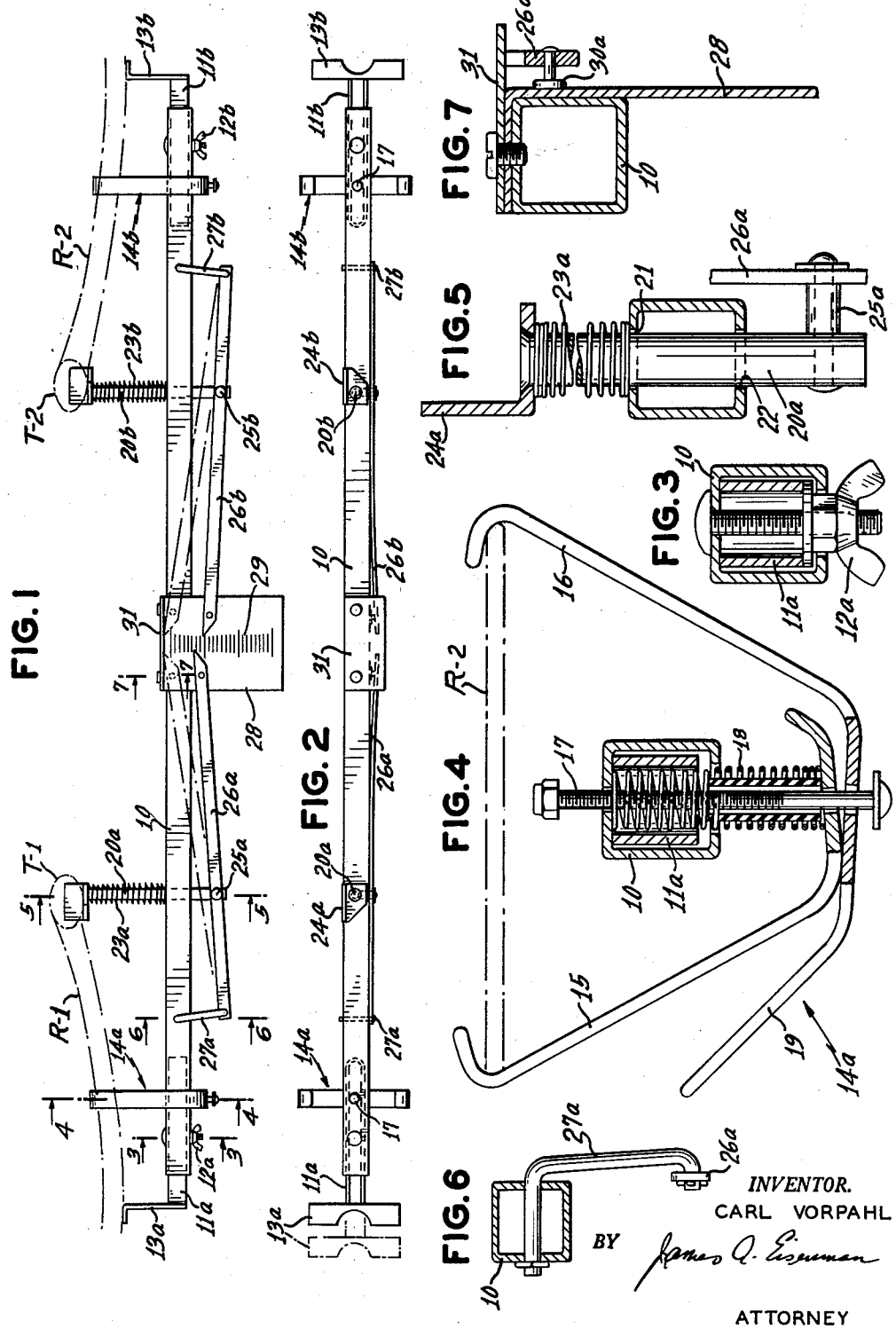
INVENTOR.
CARL VORPAHL
BY James Q. Eisenman
ATTORNEY United States Patent Office 3,108,382
Patented Oct. 29, 1963

3,108,382
TORSION BAR GAUGE
Carl Vorpahl, 18 Nursery Lane, Huntington Station, N.Y.
Filed May 1, 1961, Ser. No. 106,673
9 Claims. (Cl. 33—181)

This invention relates to tools, and more particularly to tools for the adjustment and setting of torsion bars in vehicles.

Torsion bars have been developed for replacing coil and leaf spring systems in vehicles. A particular advantage of torsion bars is that they can be adjusted readily to compensate for different load factors and for fatigue in materials involving the suspension systems. Because torsion bars have found widespread use in front end assemblies of automobiles, and because it is virtually impossible to align front wheels of automobiles if the torsion or spring system is not correctly adjusted, there is widespread need for tools for effecting accurate torsion bar adjustment. It is particularly important that the gauge display the actual torsion bar settings clearly because illumination is poor beneath vehicles and the mechanic must work at a point remote from the gauging points. The requirements imposed upon such gauging devices are particularly severe because torsion bar adjustments must be made within a small fraction of an inch.

Accordingly, it is one object of the present invention to provide an improved torsion bar setting gauge which can be readily affixed beneath the wheel suspension system of a vehicle. It is another object of the invention to provide a torsion bar setting gauge which is adjustable to accommodate a variety of vehicles.

It is another object of the invention to provide a torsion bar setting gauge which can be accurately read from a distance of approximately half a car length, and in which the relative settings of two complementary torsion bars may be read.

Still another object of the invention is to provide a torsion bar gauge for vehicles which can be quickly attached and detached from the vehicle.

In accordance with the present invention, there is provided a torsion bar setting tool or gauge comprising an elongated frame adapted to be suspended beneath the front end assembly of a motor vehicle by means of lever operated spring biased clamps. Slideably mounted in each end of the frame are laterally adjustably movable gauge plates which are adapted to rest on the underside of the outer ends of the radius arms which connect the torsion bars to the respective front wheels. Vertically movable spring-biased feeler arms are also carried by the frame to engage the radius arms at the point of junction with the torsion bar. The latter elements are vertically movable and are coupled to a pair of elongated pointers which are pivoted to the frame end which serve to amplify the vertical motion which is displayed on a common calibrated scale carried by the center of the frame. In this fashion, a mechanic working at a point rearwardly of the front end assembly can readily perceive the adjustment setting of the torsion bars and make compensating adjustments.

A preferred form of the invention embodying the above and other features is described in the following specification having reference to the accompanying drawings in which:

FIGURE 1 is a view in front elevation showing the tool on gauge mounted in position for torsion bar measurement;

FIGURE 2 is a plan view of the tool;

FIGURE 3 is a view in transverse section, along line 3—3 of FIGURE 1;

FIGURE 4 is a view in transverse section, along the line 4—4 of FIGURE 1;

FIGURE 5 is a view in transverse section, along the line 5—5 of FIGURE 1;

FIGURE 6 is a view in transverse section, along the line 6—6 of FIGURE 1; and

FIGURE 7 is a view in transverse section, along the line 7—7 of FIGURE 1.

Referring to the drawings, the invention is illustrated as embodied in a torsion bar setting tool or gauge comprising an elongated frame member 10, of a square, hollow cross section having slideably fitted into its ends a pair of telescoping extension members 11a and 11b, secured by thumb screws 12a and 12b, respectively, the extension members carrying at their free or outer ends abutment members 13a and 13b, respectively, adapted to engage the outer ends of the radius or lower suspension arms R–1 and R–2 (indicated in phantom lines in the drawing) which connect the torsion bars T–1 and T–2 of a vehicle to the wheel suspending assembly (not shown).

The frame 10 is adapted to be suspended from the underside of the frame of the vehicle by means of spring-biased clamps 14a and 14b which positions the tool or gauge so that the abutment pieces 13a and 13b, properly extended, butt upwardly against the ball joint sockets at the outer ends of the radius or lower suspension arms. The clamps 14a and 14b are identical, and are illustrated in detail in FIGURE 4. Referring to that figure, each of the clamps comprises a pair of lever arms 15 and 16, the inwardly curved upper ends of which are adapted to engage the flange of the lower suspension or radius arm R–1 of the vehicle. The arms 15 and 16 are carried by a depending pin or bolt 17, which passes upwardly through the frame 10, and a coil spring 18 reacting between the frame 10 and the upwardly facing surface of the arm 15 urges the two arms downwardly. Thus the spring 18, with the arms 15 and 16 of the clamp assembly attached to the radius arms R–1 and R–2, urges the frame 10 upwardly to seat the abutment pieces or gauge members 13a and 13b against the radius arms. The lower end of the clamp portion 16 includes an extension arm 19, which forms an angle with the shank of the arm 15. By squeezing the extension 19 and the arm 15, the clamp assembly can be readily opened to be attached to or released from the frame of the vehicle, each clamp being operable by a single hand hold. Both arms 15 and 16 are freely pivotally mounted on the pin 17 so that the entire clamp assembly can be swiveled as a unit or, if desired, the arms may be swiveled independently to facilitate mounting on the vehicle.

Vertically, slideably mounted in the frame 10 at points between the middle and the respective ends of the frame are gauging arms or members 20a and 20b (illustrated in enlarged scale in FIGURE 5). Referring to FIGURE 5, the gauging arm 20a is slideably mounted in vertically aligned openings 21 and 22 in the frame 10 and is spring-biased upwardly by means of a coil spring 23a, which reacts between the frame 10 and a gauge seat 24a affixed to the upper end of the arm 20a. Pivotally coupled to the lower end of the arm 20a by a coupling pin 25a is an indicating lever arm 26a, best seen in FIGURE 1. The fulcrum for the arm 26a is disposed at its outer end and comprises a swinging link 27a (FIGURE 6) pivoted in the frame 10 at its upper end and pivotally connected at its lower end to the arm 26a. In a like manner the gauging arm 20b is pivotally connected between the ends of an indicating lever arm 26b by means of a coupling pin 25b and to the frame by a swinging fulcrum link 27b.

The moving or working ends of the indicating levers 26a and 26b, which effectively amplify the motion of the gauging arms 20a and 20b, pass along the front face of a gauge plate 28, which carries a vertically calibrated scale 29. Preferably, the scale 29 is calibrated to read increments of displacement of one-sixteenth (1/16) of an inch of the gauging arms and in addition is color coded to indicate preferred settings for several different models of vehicles. As best seen in FIGURE 7, the free or working end of the pointer arm 26a carries a guide bushing 30a, which rides on the face of the indicator plate 28 and which is adapted, when the tool is not in use, to be seated beneath the plate 28 to lock the pointer arms in place under the pressure of the compression spring 20a. The upper limit of travel of the pointer arms 26a and 26b is defined by an overhanging plate 31 secured to the frame 10.

In operation with the vehicle supported on a lift whereby the weight of the vehicle is carried on the wheel assembly, the torsion bar gauge is first clamped to the transverse radius arms of the vehicle by means of the finger grip clamp assembly 14a and 14b. If necessary, the extension arms 11a and 11b are adjusted to cause the bearing plates 13a and 13b to bear upwardly against the free ends of the radius arms R-1 and R-2. The bearing pieces 24a and 24b of the gauging arms 20a and 20b press upwardly against the torsion bars T-1 and T-2, respectively, under the influence of the compression springs 23a and 23b, the working or inner ends of the lever arms 26a and 26b having first been freed from their resting positions at the bottom of the gauge plate 28. The mechanic then views the indicator plate 28 from a point spaced rearwardly from the front end assembly or more particularly at the point at which the wrench for effecting adjustment of the torsion bars is applied. The relative adjustment of the two torsion bars is immediately conspicuous as a result of the alignment or misalignment, as the case may be, of the pointer tips of the arms 26a and 26b. Also visible to the mechanic is the desired setting for the torsion bars, as determined by the manufacturer of the vehicle. The two torsion bars are adjusted to the desired setting by the application of torque thereto with the lock nuts released. The tool is then released from the vehicle by means of the finger grip clamps and the operation is completed.

While the invention as described above having reference to a preferred arrangement thereof it will be understood that it can take various forms and arrangements without departing from the scope of the invention, which should not, therefore be regarded as limited except as defined in the following claims.

I claim:

1. A torsion bar setting gauge for vehicles having at least two complementary, spaced-apart torsion bar suspension assemblies each having a torsion bar and a radius arm extending therefrom, the invention comprising an elongated frame, means to attach the frame to the vehicle to bridge the distance between at least two torsion bar assemblies of the vehicle, at least two pairs of relatively movable gauge members carried by the frame to engage, pair by pair, the respective torsion bar assemblies, one gauge member of each pair engaging the corresponding assembly adjacent the axis of the torsion bar and the other engaging the assembly at a point on the radially extending arm, at least two movable pointer means coupled respectively with the pairs of gauge members and responsive to relative movement thereof, all of said pointer means displaying their output motions adjacent a common point, and calibrated gauge plate supported by the frame adjacent said point, whereby the torsion bar settings of said complementary suspension assemblies may be read from the same calibrated plate and whereby the relative settings of the suspension assemblies are indicated by the relative positions of the pointer means.

2. Apparatus as set forth in claim 1, including means to support one of each pair of gauging members for longitudinal adjusting movement relative to said frame.

3. Apparatus as set forth in claim 1, said pointer means including motion amplifying means to amplify the relative movement of the said pairs of gauge members.

4. A torsion bar setting gauge for vehicles having at least two complementary, spaced-apart torsion bar suspension assemblies each having a torsion bar and a radius arm extending therefrom, the invention comprising an elongated frame, releasable clamping means to attach the frame to the vehicle beneath the suspension assemblies to bridge the distance between at least two of said assemblies, two pairs of relatively movable gauge members carried by the frame on opposite sides of the center thereof to engage the respective torsion bar assemblies, one member engaging the assembly adjacent the axis of the torsion bar and the other engaging the radius arm at a point spaced radially from the bar, a pair of pointer means operatively connected respectively with each pair of gauge members and responsive to relative displacement thereof, said pointer means each comprising a lever arm pivotally connected to the frame and having a tip adjacent the center of the frame, and a calibrated gauge plate supported by the frame adjacent the center of the bar and common to the two lever arms, whereby the torsion bar settings of said complementary assemblies may be read from the same gauge plate and whereby the relative setting of the two suspension assemblies are indicated by the relative positions of the tips of the lever arms.

5. Apparatus as set forth in claim 4, each pair of gauge members comprising an outer member supported adjacent the end of the frame and an inner member spaced inwardly along the frame from the outer member, said inner member being vertically movable in the frame, spring means to urge the inner gauge member upward against the corresponding torsion bar of the vehicle, and means to couple the inner member to the lever arm of its corresponding pointer means.

6. Apparatus as set forth in claim 5, including a pair of swinging links to connect the respective lever arms to the frame.

7. Apparatus as set forth in claim 4, said releasable clamping means to attach the torsion bar setting gauge to the vehicle comprising a pair of spring-biased clamps to engage the radius arm between the points of engagement by the gauge members, whereby the spring force which urges the movable gauge member against the torsion bar also seats the clamps on the torsion bar.

8. Apparatus as set forth in claim 7, each of said spring-biased clamps comprising a pair of clamping arms loosely, pivotally supported by the frame for pivotal and rocking movement about a common pivot, and vertically movable thereon, one of said arms including an extension portion adjacent the shank of the other, whereby the clamp may be opened and manipulated for attachment to and release from the torsion bar.

9. Apparatus as set forth in claim 8, said spring-biased clamps comprising first springs urging the inner gauging members upward and second springs urging the clamps downward.

No references cited.